United States Patent
Kwak et al.

(10) Patent No.: US 8,518,574 B1
(45) Date of Patent: Aug. 27, 2013

(54) HEAT CONTROL POUCH FOR BATTERY CELL MODULE AND BATTERY CELL MODULE HAVING THE SAME

(75) Inventors: Jin Woo Kwak, Gyeonggi-do (KR); Kyong Hwa Song, Seoul (KR); Han Saem Lee, Gyeonggi-do (KR); Byung Sam Choi, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/467,395

(22) Filed: May 9, 2012

(30) Foreign Application Priority Data

Feb. 8, 2012 (KR) .................... 10-2012-0012855

(51) Int. Cl.
*H01M 10/50* (2006.01)

(52) U.S. Cl.
USPC .............................. 429/120; 429/185; 429/62

(58) Field of Classification Search
USPC ......... 429/61, 62, 148, 50, 120, 72; 165/185, 165/80.1–80.5; 361/676–831; 174/15.1–16.3, 174/252; 257/712–721
See application file for complete search history.

(56) References Cited

U.S. PATENT DOCUMENTS

| | | | | |
|---|---|---|---|---|
| 5,020,586 A | * | 6/1991 | Mansingh | 165/80.3 |
| 7,018,701 B2 | * | 3/2006 | Yamada et al. | 428/137 |
| 7,682,690 B2 | * | 3/2010 | Bunyan et al. | 428/323 |
| 2002/0155333 A1 | | 10/2002 | Fitts et al. | |
| 2007/0292751 A1 | * | 12/2007 | Cherng et al. | 429/120 |

FOREIGN PATENT DOCUMENTS

| | | |
|---|---|---|
| JP | 2000306563 A | 11/2000 |
| KR | 10-2005-0069075 | 7/2005 |
| KR | 10-1025394 | 5/2006 |
| KR | 20-0427596 | 9/2006 |
| KR | 10-2007-0106813 | 11/2007 |
| KR | 10-2009-0069467 A | 7/2009 |
| KR | 10-2010-0109872 A | 10/2010 |
| KR | 10-2011-0019490 | 2/2011 |

OTHER PUBLICATIONS

Application 13467395—Calculations (1 Page).*

* cited by examiner

*Primary Examiner* — Basia Ridley
*Assistant Examiner* — Caitlin Wilmot
(74) *Attorney, Agent, or Firm* — Edwards Wildman Palmer LLP; Peter F. Corless (57) ABSTRACT

Disclosed are a heat control pouch and a battery cell module having the same. The heat control pouch is interposed between battery cells. The heat control pouch includes a high thermal conductivity case having a sealed internal space, a phase change composite filled in the internal space of the high thermal conductivity case, and an elasticity sheet attached to both upper and lower surfaces of the high thermal conductivity case. Here, the elasticity sheet is formed of a thermoplastic elastomer composite containing a high thermal conductivity filler.

9 Claims, 5 Drawing Sheets

HEAT CONTROL POUCH FOR BATTERY CELL MODULE AND BATTERY CELL MODULE HAVING THE SAME

CROSS-REFERENCE TO RELATED APPLICATION

This application claims under 35 U.S.C. §119(a) the benefit of Korean Patent Application No. 10-2012-0012855 filed Feb. 8, 2012, the entire contents of which are incorporated herein by reference.

BACKGROUND (a) Technical Field

The present invention relates to a heat control pouch and a battery cell module having the same. More particularly, it relates to a heat control pouch and a battery cell module having the same, which maintains an optimum temperature of a battery under various operational and temperature conditions and absorbs volumetric variations of a battery cell.

(b) Background Art

Generally, local temperature differences and high temperatures may occur in batteries of electric vehicles due to the amount of heat generated by the battery's high-output, high-speed, and repetitive charging and discharging, causing thermal runaway that hinders the efficiency and stability of batteries. The thermal runaway results from deficiency of heat radiation and diffusion capacity to the outside of the batteries compared to heat generated within batteries.

Lithium secondary batteries, which have a working voltage of about 3.6 V or more, are being used as power sources for portable electronics and in high-power hybrid vehicles by being connected in series to each other. The lithium secondary batteries have a working voltage three times higher than that of nickel-cadmium batteries or nickel-metal hybrid batteries, and have a better energy density per unit weight as well.

Various types of Lithium secondary batteries can be manufactured. Recent lithium secondary batteries of a pouched type with flexibility are relatively flexible in shape and therefore are ideal in automotive applications.

Battery cells constituting a typical pouched-type lithium secondary battery include a battery part and a pouched-type case having a space receiving the battery part. The battery part includes an anode plate, a separator, and a cathode plate that are sequentially disposed and wound in one direction, or includes a plurality of anode plates, separators, and cathode plates stacked in a multi-layered structure. Also, the case can be flexibly bent due to its excellent formability.

The pouched-type battery cells may vary in volume due to intercalation/deintercalation of lithium ions to/from electrode material during charging/discharging as discussed in *Journal of Power Sources*, by J. H. Lee et al. 119-121 (2003) 833-837 which is hereby incorporated by reference in its entirety.

The damage of the separator due to expansion of the electrode plate in the battery cell incurs generation of internal resistance, increase of voltage, and reduction of battery capacity. Also, when the volume of a battery cell in a typical battery system increases, a channel formed between two battery cells in a battery cell unit decreases in size, reducing the cooling effect rather than a channel formed between modules. Accordingly, heat generation between battery cells due to rising temperatures of adjacent battery cells is accelerated. This causes a rapid reduction in the battery performance as a result.

In addition, when the volume expansion of the battery cell is severe, the case may be damaged thereby causing leakage of the electrolyte and gas from inside the battery. Furthermore, since the battery cell module is structured by stacking a plurality of battery cells (or unit cells), the volume expansion of the battery cell, gas leakage, or even explosion of a cell may cause damage to the cells surrounding it.

The air cooling channel between cells of a battery cell module is necessary for effective heat radiation. However, since a space of about 3-5 mm is usually required between all battery cells, energy density versus volume cannot be easily increased.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a heat control pouch and a battery cell module having the same, which is an interface component, interposed between battery cells of a pouched-type battery cell module, and maintains an optimum temperature of a battery under various operational and temperature conditions and absorbs volumetric variations of a battery cell.

In one exemplary embodiment of the present invention, a heat control pouch for a battery cell module is interposed between battery cells. The heat control pouch includes a high thermal conductivity case having a sealed internal space, a phase change composite filled in the internal space of the high thermal conductivity case, and an elasticity sheet attached to both upper and lower surfaces of the high thermal conductivity case. The elasticity sheet is formed of a thermoplastic elastomer composite containing a high thermal conductivity filler.

In an exemplary embodiment, the phase change composite may be a composite material in which the high thermal conductivity filler is dispersed in a phase change material. The phase change composite may include a phase change material of about 50 wt % to about 60 wt % and the high thermal conductivity filler of about 40 wt % to about 50 wt % that are mixed.

In some embodiment, the high thermal conductivity case may include radiant heat fins at both edges thereof, and the radiant heat fin protrudes toward an air channel between battery cell modules. The radiant heat fin may be perpendicular to the flow direction of cooling air in the air channel between the battery cell modules.

In some embodiments, the elasticity sheet may have a thermal conductivity of about 2 W/mK in the thickness direction, and may show a compression set of about 10% to about 25% compression.

In another further exemplary embodiment, the thermoplastic elastomer composite may include a thermoplastic elastomer material of about 60 wt % to about 80 wt % and the high thermal conductivity filler of about 20 wt % to about 40 wt % that are mixed.

In still another further exemplary embodiment, the high thermal conductivity filler may include either graphite, boron nitride, silicon carbide, aluminum nitride, or a combination thereof.

In another aspect, the present invention provides a battery cell module including a plurality of battery cells and a heat control pouch interposed between the battery cells. The heat control pouch includes a high thermal conductivity case having a sealed internal space, a phase change composite filled in the internal space of the high thermal conductivity case, and an elasticity sheet attached to both upper and lower surfaces of the high thermal conductivity case. The elasticity sheet is formed of a thermoplastic elastomer composite containing a high thermal conductivity filler.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

10: heat control pouch
    11: high thermal conductivity case
    12: phase change composite
    13: radiant heat fin
    14: elasticity sheet
    15: binder
    20: battery cell
    21: electrode part It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

Hereinafter, exemplary embodiments of the present invention will be described in detail with reference to the accompanying drawings.

Generally, when the working temperature is greater than about 50° C. or smaller than about 0° C. in a battery cell module, the lifespan of a battery may be affected. Accordingly, temperature needs to be appropriately controlled to secure the performance and the lifespan of the battery.

A heat control pouch according to an exemplary embodiment of the present invention, which is an interface component for controlling heat of a battery cell module, provides excellent heat radiation performance under typical climatic conditions and maintains an optimum temperature in low temperature environments to prevent performance reduction of the battery cell module and to secure the lifespan and the stability of the battery cell module. Also, the heat control pouch may be configured to absorb volume variations of a battery cell.

A heat control pouch for a battery cell module according to the exemplary embodiment of the present invention can appropriately maintain the internal temperature of a battery cell module by absorbing heat when the temperature of a battery cell rises and discharging heat when the temperature of the battery falls, based on an optimum working temperature range of the battery cell to prevent performance reduction within a battery.

Also, a heat control pouch for a battery cell module according to the exemplary embodiment of the present invention may have increased elasticity and heat radiation performance for dealing with volumetric variations of a battery cell generated due to charging and discharging, in order to achieve compact battery heat radiation system design for improving energy density versus volume.

Thus, a heat control pouch according to the exemplary embodiment of the present invention may be interposed between pouched-type battery cells, and may be compressed and restored during charging and discharging to absorb volumetric variations within the battery cell. The heat control pouch may be configured to maximize the heat control characteristics by using a material and structure with excellent thermal conductivity.

Figure 1:
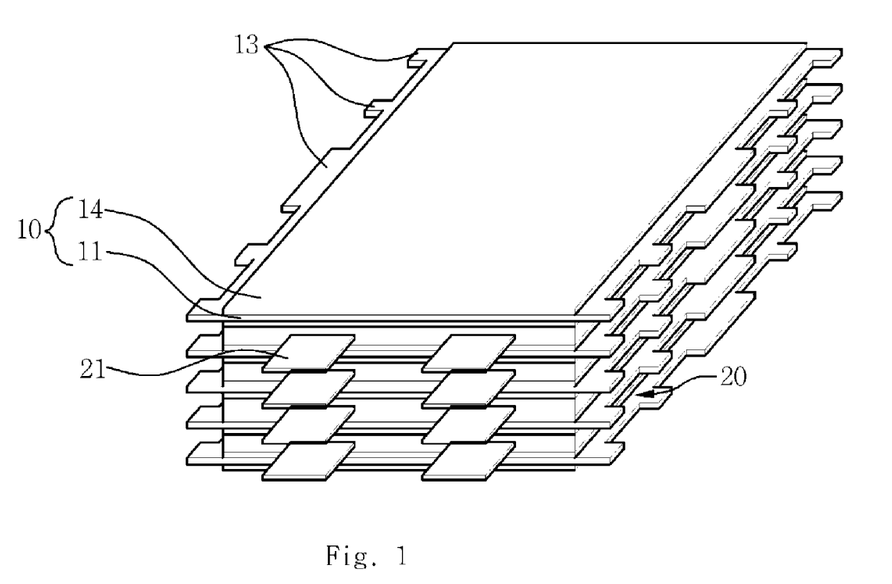
FIG. 1 is a perspective view illustrating a battery cell module having a heat control pouch according to an exemplary embodiment of present invention.
Figure 2:
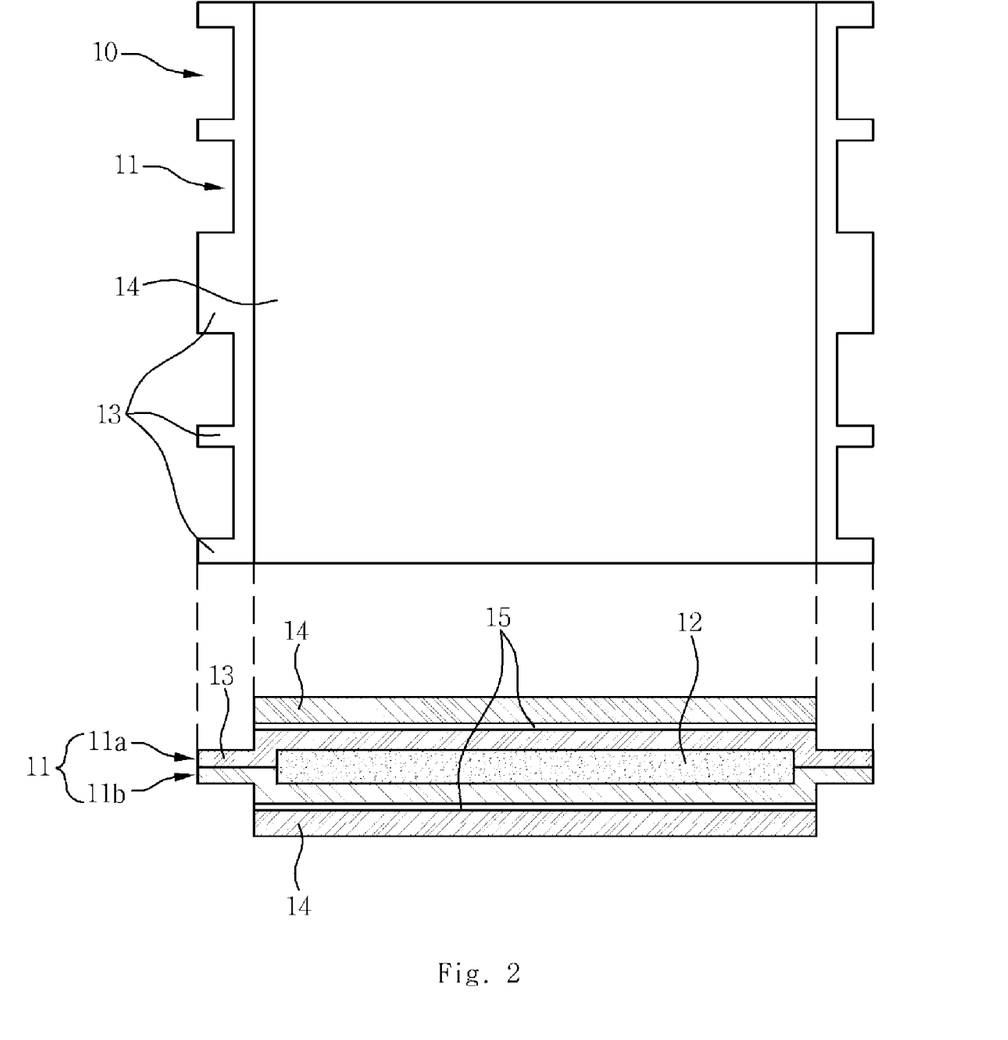
FIG. 2 is a plan and side view illustrating a heat control pouch for a battery cell module according to an exemplary embodiment of the present invention.

As shown in FIGS. 1 and 2, a heat control pouch 10 according to an embodiment of the present invention may be interposed between battery cells 20. The heat control pouch 10 may include a high thermal conductivity case 11 having a sealed internal space, a phase change composite 12 filled in the internal space of the case, and an elasticity sheet 14 attached to both upper and lower surfaces of the case 11. The high thermal conductivity case 11 may be formed of an aluminum material with excellent thermal conductivity, and may have an internal space formed by joining an upper plate 11*a* and a lower plate 11*b*.

Under low temperature environments, a battery system should be maintained at an optimum temperature range of about 35° C. to about 40° C. to prevent the performance reduction of a battery. Thus, the liquid phase change composite 12 may be injected into the case 11 to maintain the internal temperature of the battery at an optimum level by absorbing heat upon temperature rising of the battery cell and discharging heat upon temperature falling through the phase change characteristics. The phase change composite 12 may be a composite material in which high thermal conductivity filler is dispersed in phase change material. The phase change composite 12 may be completely or almost completely filled with high thermal conductivity filler to cause an effective phase change reaction.

Since the high thermal conductivity filler is dispersed in the phase change composite 12, heat transfer may be uniformly and efficiently performed to the entire phase change material. The phase change material is a matrix material of the phase change composite 12, thereby improving the phase change characteristics. Specifically, the phase change composite 12 may include the phase change material of about 50 wt % and about 60 wt % and the high thermal conductivity filler of about 40 wt % to about 50 wt %.

If the phase change composite 12 contains the high thermal conductivity filler of about 40 wt % or less, heat transfer may not be effectively performed, slowing down the phase change reaction. On the other hand, if the phase change composite 12 contains the high thermal conductivity filler of about 50 wt % or more, the heat capacity may be significantly lowered, making it difficult to perform an optimum temperature maintenance function. The phase change material may include n-octadecane, and the high thermal conductivity filler may include a material with excellent thermal conductivity, for example, one of graphite, boron nitride, silicon carbide, aluminum nitride, and a combination thereof.

A compressible and restorable elasticity sheet 14 may be laminated and pressed on both surfaces (surfaces contacting the surface of battery cell) of the high thermal conductivity case 11 to absorb volumetric variations of the battery cell 20.

The elasticity sheet 14 may be formed of a thermoplastic elastomer composite with elasticity and thermal conductivity to transfer heat radiated from the battery cell 20 to the case 11 or transfer heat radiated from the phase change composite 12 to the battery cell 20. Specifically, the elasticity sheet 14 may be formed of a thermoplastic elastomer composite containing high thermal conductivity filler. The thermal elastomer composite is a high thermal conductivity filler with excellent thermal conductivity and thermoplastic elastomer with excellent gripping properties.

Since the thermoplastic elastomer composite uses an elastomer material with excellent gripping properties as a matrix material, improved heat transfer characteristics may be expected by minimizing a gap at an interface with the surface of the battery cell 20. This gap greatly affects the heat transfer resistance factor.

The thermoplastic elastomer composite may be configured to contain the high thermal conductivity filler of about 20 wt % or more to allow the thermal conductivity of the elasticity sheet 14 manufactured by injection to be equal to or greater than about 2 W/mK in the thickness direction. The thermoplastic elastomer composite may include the elastomer material of about 60 wt % to about 80 wt % and the high thermal conductivity filler of about 20 wt % to about 40 wt %.

If the elastomer composite contains the high thermal conductivity filler of about 20 wt % or less, heat conductivity may be lowered in the thickness direction, making heat transfer to the case 11 difficult. On the other hand, if the elastomer composite contains the high thermal conductivity filler of about 40 wt % or more, the total wt may increase, and the mechanical properties may be reduced.

The high thermal conductivity filler contained in the elastomer may include a material with excellent thermal conductivity, for example, one of graphite, boron nitride, silicon carbide, aluminum nitride, and a combination thereof. The compression set of the elasticity sheet 14 may be about 10~25% compression. The compression set may be considered as the strain remaining in a sample after a compressive stress is removed. Generally, the compression set may be expressed as a percentage with respect to the size of the original sample. The compression set may be considered as a compression degree that is not restored after the stress is removed. After the compressive stress applied by the battery cell 20 is removed, the elasticity sheet 14 may be restored to a degree of about 75% to about 90% of the original elasticity sheet 14.

The elasticity sheet 14 may be allowed to have a smooth surface at a portion contacting the surface of the battery cell 20 to maximize the contact area with the battery cell 20. Thus, the interfacial resistance is minimized during the heat transfer, thereby showing effective heat transfer characteristics.

As shown in FIG. 2, the elasticity sheet 14 may be attached on the case 11 through a binder 15. The binder 15 may include typical adhesives, and a material that does not hinder the heat transfer between the case 11 and the elasticity sheet 14.

Figure 4:
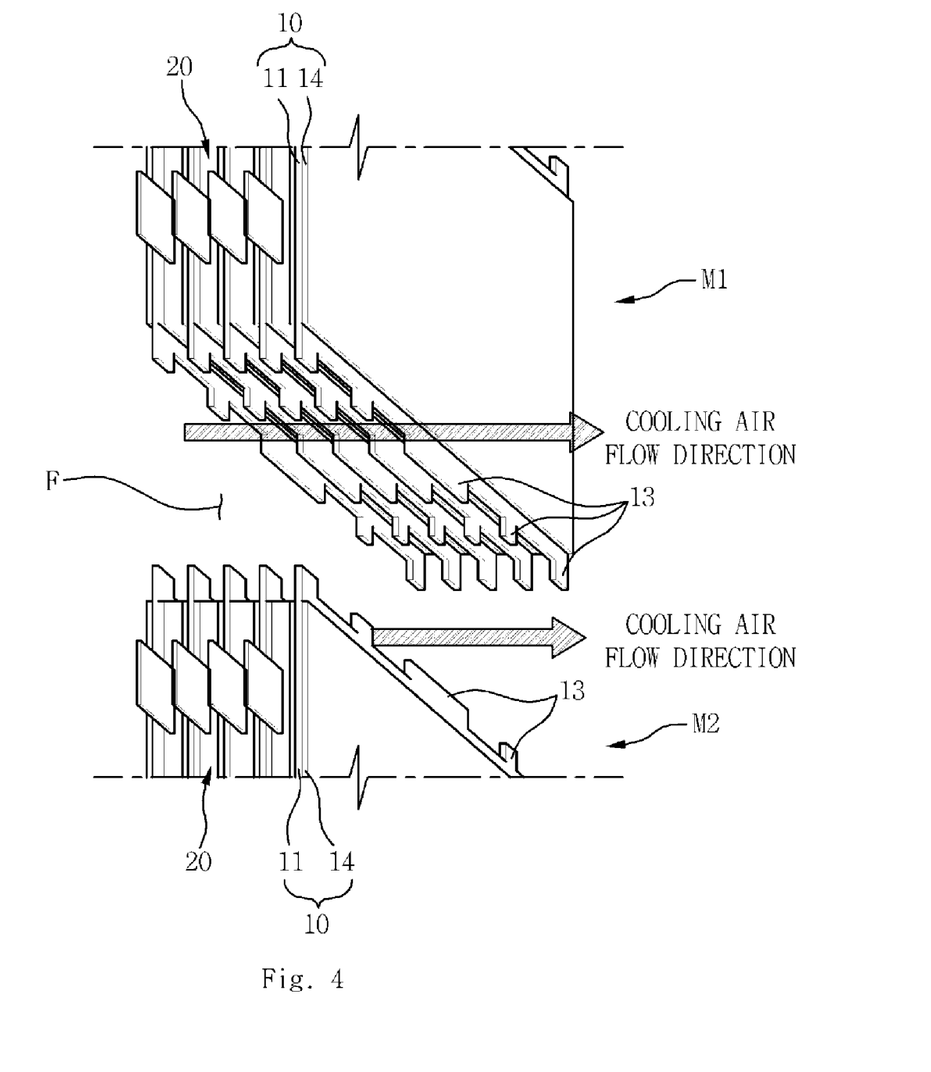
FIG. 4 is a view illustrating an air channel formed between battery cell modules according to an exemplary embodiment of the present invention.

In order to effectively radiate heat within the battery cell 20 delivered through the elasticity sheet 14, the high thermal conductivity case 11 may include radiant heat fins 13 at both edges thereof. The radiant heat fin 13, e.g., effectively a heat sink, increases the specific surface area at the edge of the case 11 to improve the heat radiation performance by air cooling. As shown in FIGS. 1 and 4, the radiant heat fin 13 may be disposed at the both edges of the case 11 to avoid the electrode part 21 of the battery cell 20 when the heat control pouch 10 is interposed between the battery cells 20. Also, the radiant heat fin 13 may protrude toward an air channel F that is formed between unit battery cell modules M1 and M2 in a battery pack unit including a plurality of unit battery cell modules M1 and M2. Thus, heat inside the battery cell 20 may be transferred to the case 11 through the elasticity sheet 14, and may be diffused into the radiant heat fin 13 along the temperature gradient to be radiated from the radiant heat fin 13 by cooling air between the unit battery cell modules M1 and M2.

The air channel F between the battery cell modules M1 and M2 may be formed perpendicular to the plate direction of the elasticity sheet 14 and the longitudinal direction of the radiant heat direction. When the air channel F is formed between the unit battery cell modules M1 and M2, the air channel F may be formed to be perpendicular to the plate direction of the elasticity sheet 14. Thus, the flow direction of the cooling air in the air channel F may become perpendicular to the plate direction of the elasticity sheet 14 and the longitudinal direction of the radiant heat fin 13, thereby achieving effective heat radiation by convection. Thus, heat generated over the battery cell 20 may be transferred in both directions of the case 11 by a heat radiation effect due to air cooling of the radiant heat fin 13, thereby minimizing a heat transfer path and reducing a local temperature difference in a battery cell module. Accordingly, the stability reduction and deterioration due to the local temperature difference in the battery cell module can be prevented.

In the heat control pouch 10, the internal space of the high thermal conductivity case 11 with excellent conductivity may be filled with the phase change composite 12, and the outer layer of the case 11 may be formed of an elastomer composite with excellent elasticity. Thus, when the heat control pouch 10 is interposed between the battery cells 20, the heat control pouch 10 is able to absorb any volumetric variations during charging and discharging of the battery cell, and can effectively maintain the battery cell module at an optimum temperature through excellent heat conduction characteristics of the case 11, the elasticity sheet 14 and an effective phase change reaction of the phase change composite 12 containing high thermal conductivity filler.

Figure 3:
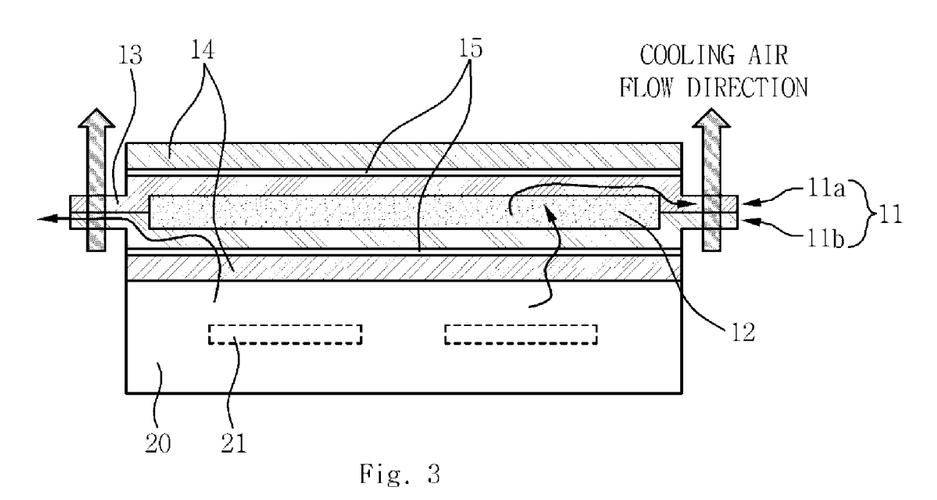
FIG. 3 is a view illustrating an operation state of a heat control pouch for a battery cell module according to an exemplary embodiment of the present invention.

As shown in FIG. 3, when thermal diffusion is performed along the temperature gradient due to heat sources generated in the battery cell 20, heat transfer may be performed through the elasticity sheet 14 on the outer layer of the heat control pouch 10. Heat transferred through the elasticity sheet 14 may be transferred to the case 11.

In this case, a portion of heat transferred to the case 11 may be transferred to the radiant heat fin 13 through thermal diffusion to be radiated. Heat transferred to the phase change composite 12 through the case 11 may be absorbed to increase the temperature of the phase change composite 12 beyond the melting point and thus cause a phase change reaction.

After the phase change reaction of the phase change composite 12, heat transferred to the phase change composite 12 among heat introduced from the battery cell 20 to the heat control pouch 10 may not be absorbed but diffused into the radiant heat fin 13 through the case 11 and radiated through the radiant heat fin 13.

Heat absorbed by the phase change composite 12 may be again radiated and used for heating the battery cell 20 to maintain the optimum temperature of the battery cell 20 when the working temperature of the battery cell 20 falls below the optimum temperature in future. Thus, in the heat control pouch 10, when the temperature of the battery cell 20 rises, heat transferred through the elasticity sheet 14 and the case 11 may be absorbed into the phase change composite 12 to phase-change the liquid phase change composite into a gaseous phase. On the other hand, when the temperature of the battery cell 20 falls, heat radiated from the phase change composite 12 may be used to heat the battery cell 20, thereby maintaining and controlling the internal temperature of the battery cell 20 at the optimum level.

Figure 5:
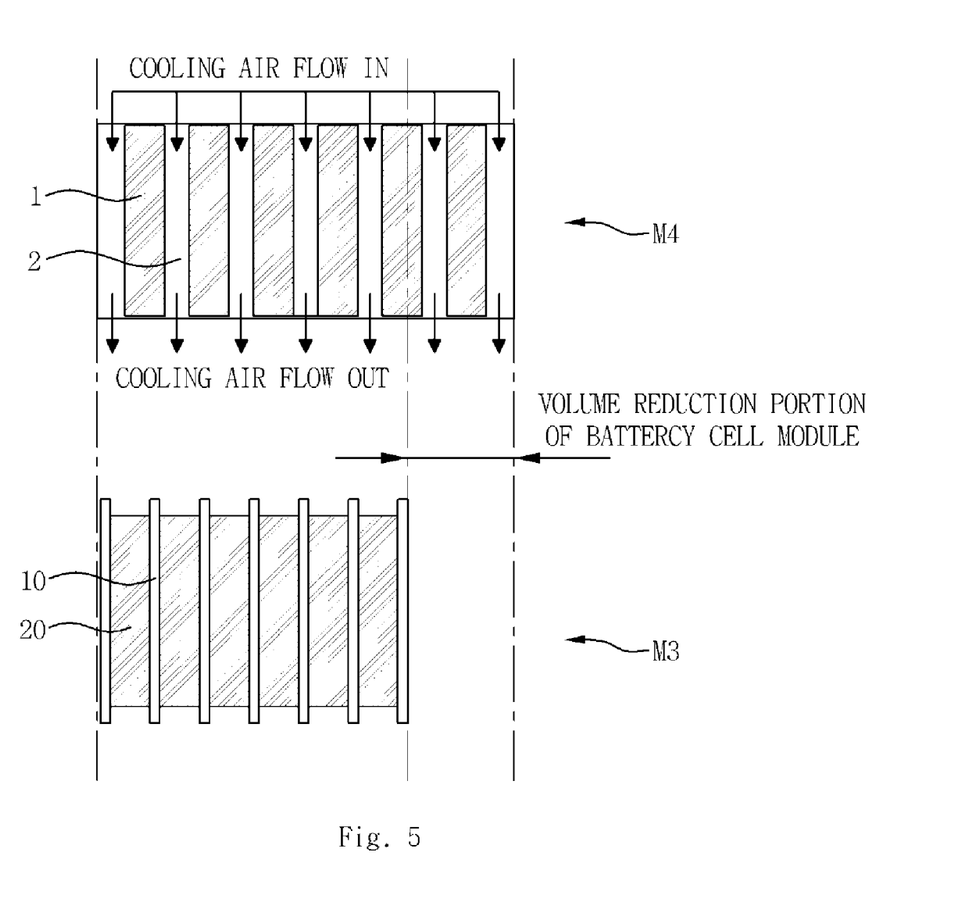
FIG. 5 is a cross-sectional view illustrating a comparison between a typical battery cell module and a battery cell module according to an exemplary embodiment of the present invention.

Referring to FIG. 5, in an air cooling heat radiation system using a typical battery cell module M4, since pouched-type battery cells 1 should be arranged at an interval of about 3 mm or more to form an air channel 2 for air cooling, the design flexibility is limited. However, in a heat radiation system using a battery cell module M3 including the heat control pouch 10, since the interval between battery cells 20 can be reduced to about 2.5 mm, i.e., interval corresponding to the thickness of the heat control pouch 10 without a separate channel space. Accordingly, energy density in equal volume compared to a typical design is improved.

The heat control pouch 10 may be manufactured as follows.

A sheet of aluminum plate having a length of about 280 mm, a width of about 190 mm and a thickness of about 0.4 mm may be prepared. A space may be formed by a stamping process to receive a phase change composite, and both edges of the aluminum plate in the width direction may be processed to form radiant heat fins (13 of FIG. 2) at a certain interval apart from each other.

After upper and lower aluminum plates are manufactured in the same size through the above process, a minute aperture having a diameter of about 0.5 mm or less may be formed at the central portion of the upper plate by a needle to receive a phase change composite, and then the upper and lower plates may be welded to form the aluminum case (11 of FIG. 2) The phase change composite may include n-octadecane as a phase change material, and a fused filler with high thermal conductivity may be uniformly dispersed into the phase change material as a matrix using shearing of about 300 rpm or more at a temperature of about 30° C. or higher. In this case, one of about 40 wt % graphite, about 30 wt % to about 40 wt % silicon carbide, and about 40 wt % to about 50 wt % boron nitride may be used as the filler. The fused phase change composite may be filled in the case (11 of FIG. 2) through the minute aperture by a syringe needle.

Next, a binder process may be performed on the surface of the case, and then the elasticity sheet (14 of FIG. 2) including styrene-ethylene-butylene-styrene (SEBS) composite with about 20 wt % high thermal conductivity filler (about 80 wt % SEBS and about 20 wt % filler) may be attached and pressed on the surface of the case. In this case, the elasticity sheet including the SEBS composite may have a thickness of about 0.5 mm. The smaller the thickness of the elasticity sheet is, the shorter the thermal diffusion distance, thereby accelerating heat transfer to the aluminum case.

The heat control pouch may have a final thickness of about 2.5 mm. Compared to the air channel of about 3 mm interval formed in a typical battery cell module, the volume per unit cell may be reduced to narrow the interval between battery cells, and thus the number of battery cells that can be mounted in the same volumetric parameters of the battery cell module is increased in the illustrative embodiment of the present invention to improve the energy density per unit volume.

Advantageously, the heat control pouch for a battery cell module according to the exemplary embodiment of the present invention can be interposed between battery cells, and can appropriately maintain the internal temperature of a battery cell module by absorbing heat when the temperature of a battery cell rises and discharging heat when the temperature of the battery cell falls and absorbs volumetric variations during charging and discharging of the battery cell, based on an optimum working temperature range of the battery cell to prevent the performance reduction of a battery. Thus, a battery cell module having the heat control pouch improves heat control performance, and provides a compact heat radiation system with improved energy density versus volume while securing the lifespan and stability of a battery.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A heat control pouch for a battery cell module, interposed between battery cells, the heat control pouch comprising:
   a high thermal conductivity case having a sealed internal space;
   a phase change composite filled in the internal space of the high thermal conductivity case; and
   an elasticity sheet attached to both upper and lower surfaces of the high thermal conductivity case, wherein the elasticity sheet is formed of a thermoplastic elastomer composite containing a high thermal conductivity filler,
wherein the high thermal conductivity case further comprises radiant heat fins formed from both edges of the high thermal conductivity case, and each of the radiant heat fins protrude in one direction toward an air channel formed between battery cell modules.

2. The heat control pouch of claim 1, wherein the phase change composite is a composite material in which the high thermal conductivity filler is dispersed in a phase change material.

3. The heat control pouch of claim 1, wherein the phase change composite further comprises a phase change material of about 50 wt % to about 60 wt % and the high thermal conductivity filler of about 40 wt % to about 50 wt % that are mixed.

4. The heat control pouch of claim 1, wherein the radiant heat fin is perpendicular to a flow direction of cooling air in the air channel between the battery cell modules.

5. The heat control pouch of claim 1, wherein the elasticity sheet has a thermal conductivity of about 2 W/mK in a thickness direction.

6. The heat control pouch of claim 1, wherein the elasticity sheet shows a compression set of about 10% to about 25% compression.

7. The heat control pouch of claim 1, wherein the thermoplastic elastomer composite comprises a thermoplastic elastomer material of about 60 wt % to about 80 wt % and the high thermal conductivity filler of about 20 wt % to about 40 wt % that are mixed.

8. The heat control pouch of claim 1 or 2, wherein the high thermal conductivity filler comprises at least one of graphite, boron nitride, silicon carbide, aluminum nitride, and a combination thereof.

9. A battery cell module comprising:
a plurality of battery cells; and
a heat control pouch interposed between the battery cells, wherein the heat control pouch includes a high thermal conductivity case having a sealed internal space, a phase change composite filled in the internal space of the high thermal conductivity case, and an elasticity sheet attached to both upper and lower surfaces of the high thermal conductivity case, and the elasticity sheet is formed of a thermoplastic elastomer composite containing a high thermal conductivity filler,
wherein the high thermal conductivity case further comprises radiant heat fins formed from both edges of the thermal conductivity case, and each of the radiant heat fins protrude in one direction toward an air channel formed between battery cell modules.

* * * * *